United States Patent [19]

Aiga et al.

[11] Patent Number: 4,883,677

[45] Date of Patent: Nov. 28, 1989

[54] METHOD OF ARRANGING A FORM OF PROCESSED MEAT

[75] Inventors: Tadao Aiga, Tokyo; Masoyoshi Kimura, Chiba, both of Japan

[73] Assignee: Kureha Chemical Industry Co., Limited, Tokyo, Japan

[21] Appl. No.: 240,002

[22] Filed: Sep. 1, 1988

Related U.S. Application Data

[62] Division of Ser. No. 7,649, Jan. 28, 1987, abandoned.

[30] Foreign Application Priority Data

Jan. 29, 1986 [JP] Japan .................................. 61-12093

[51] Int. Cl.$^4$ .............................................. A23B 4/04
[52] U.S. Cl. .................................... 426/420; 426/129; 426/412; 426/415

[58] Field of Search ............... 426/105, 129, 415, 412, 426/413, 420; 53/442

[56] References Cited

U.S. PATENT DOCUMENTS 3,897,567  7/1975  Inklaar ................................ 426/129
4,652,490  3/1987  Avita et al. ......................... 426/129

Primary Examiner—George Yeung
Attorney, Agent, or Firm—Koda and Androlia

[57] ABSTRACT

Raw meat for ham, roast pork and sausage is wound or wrapped with member in the form of string or net made of thermoplastic resin such as polyvinylidene chloride which has been processed to possess heat contraction property. In heating process of the meat such as boiling or smoking, the string or netlike member contracts by heating to strongly fasten the heated meat so that the form of the processed meat is arranged.

6 Claims, 1 Drawing Sheet

METHOD OF ARRANGING A FORM OF PROCESSED MEAT

This is a division of application Ser. No. 007,649, filed Jan. 28, 1987 now abandoned.

BACKGROUND OF THE INVENTION

1. Field of the Invention

The present invention relates to a method of arranging a form of processed meat and member for arranging the form of processed meat, and more particularly, to a method and member for arranging a form of meat in which, in a process of manufacturing processed meat such as ham, roast pork, sausage and the like, raw meat is wrapped with string of a netlike member made of resin material to arrange the form of the meat and the meat is then heated in a smoking or boiling process.

2. Prior Art

In a process of manufacturing processed meat such as roast pork, ham, sausage and the like, raw meat is wrapped with string or a netlike forming member and the meat is subjected to a smoking or boiling process. The reason why the forming member is employed is to arrange a form of the meat being in an indeterminate shape to a predetermined form and prevent the meat from being transforming.

The conventional forming member is formed of cotton string or rubber string or a mixture thereof. However, the arrangement of the meat to the predetermined form by wrapping the string forming member made of cotton around the meat requires large force to fasten the meat. Further, when the netlike forming member is also employed, it is necessary to push the meat into the net with large force in order to arrange the meat to a proper state. Accordingly, the working efficiency of the manufacturing process is deteriorated.

Since cotton string is poor in resilience, the meat may be fastened insufficiently and unevenly and the arrangement of the meat may be deteriorated. Since the cotton string is a natural material, there are many cases where it is contaminated by spore forming bacteria, and further since it has moisture absorption characteristics, it forms a hotbed for growth of bacteria. Accordingly, meat wrapped with cotton string may not be wholesome. Further, when rubber is employed to wrap the meat, the smell of rubber may be introduced into the meat in a heating process such as smoking or boiling and the taste of the processed meat deteriorates accordingly.

SUMMARY OF THE INVENTION

It is an object of the present invention to provide a method of arranging a form of processed in which processed meat is strongly fastened by a forming member after being smoked or boiled so that the meat is arranged in a good form or good external appearance without transformation.

It is another object of the present invention to provide a method of arranging a form of meat in which raw meat can be softly wrapped with the forming member so that the raw meat can be easily processed.

It is a further object of the present invention to provide a forming member for arranging a form of meat by heating the meat which is wholsome without contamination due to bacteria.

DETAILED DESCRIPTION OF THE INVENTION

Figure 1:
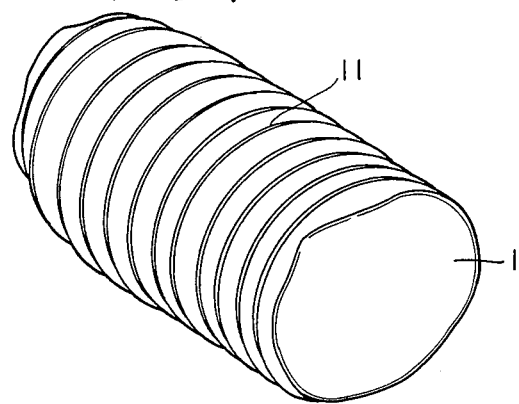
FIG. 1 is a perspective view showing meat having a form arranged by a resin member formed in string and having heat contraction property.

Referring to FIG. 1, raw meat 1 is wrapped with a forming member 11 in the form of string so as to manufacture ham. The wrapped meat is then heated in a smoking or boiling process.

Figure 2:
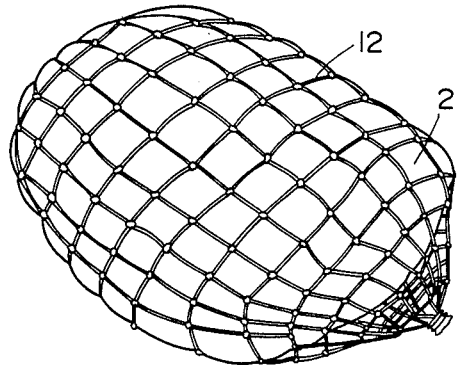
FIG. 2 is a perspective view showing meat having a form arranged by a resin member formed in net and having heat contraction property.
Figure 3:
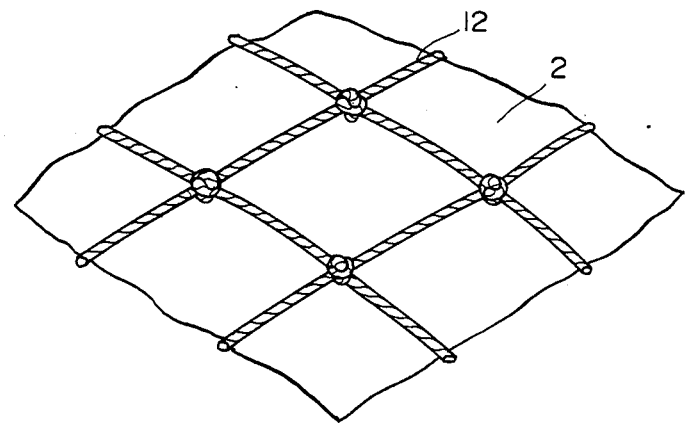
FIG. 3 is an enlarged view of the netlike resin member having heat contraction property and wrapping the meat.

Further, as shown in FIGS. 2 and 3, raw meat 2 is wrapped with netlike forming member 12 to arrange the form of the meat so as to manufacture roast pork and the like. Then, the wrapped meat is also heated.

Stuff or material forming the string member 11 and the netlike member 12 employs fiber made of thermoplastic resin which has been processed in a state possessing ehat contraction property. More particularly, the thermoplastic resin such as polyvinylidene choride or vinyl choride is extruded and cooled and then uniaxially drawn to form the fiber which is used for the forming member. Thus drawn fiber made of themoplastic resin is given the heat contraction property that the fiber contracts at a predetermined rate in accordance with the extrusion and drawing condition and type and amount of a plasticizer when the fiber is heated. Since the forming members 11 and 12 are employed to wrap foodstuff, it is a matter of course that the thermoplastic resin of the stuff and the additive such as the plasticizer must satisfy the food regulation in Japan and other countries, for example, such as the FDA and BGA.

The string forming member 11 shown in FIG. 1 employs a string formed by bundling fibers and twisting them. The string forming member 11 is wrapped around the raw meat 1 to manufacture ham. Further, with the forming member 12 shown in FIGS. 2 and 3, the fibers made of the thermoplastic resin are bundled and twisted to form a string and the string is knotted to form a net, which is used as the forming member 12. In the manufacturing process of roast pork, the forming member 12 formed in the net is employed to wrap the raw meat 2. While the netlike member 12 is formed to include square members as shown in FIGS. 2 and 3, it may be formed to include lozenged meshes. Further, it may be formed to include meshes in various other shapes such as hexagon.

In addition, thermoplastic resin film which is formed by biaxially stretching the thermoplastic resin and given the heat contraction property may be used to form the string forming member 11 by twisting the thermoplastic resin film or to form the netlike member 12 by knotting the film in the form of net.

The thermoplastic resin may be extruded to form a net and the net is stretched lenghtwise and crosswise to be processed to the state possessing the heat contraction property. The stretched net can be employed for the forming member 12.

Description is now made to the processing of the meat using the members 11 and 12.

In the case of ham shown in FIG. 1, the string forming member 1 is wound on the meat 1 which has been seasoned, while in the case of roast pork and the like shown in FIG. 2, the meat 2 is entered or pushed into the netlike forming member 12. In this case, however, it is not necessary to wind or fasten the string member 11 on the meat 1 strongly or to push the meat 2 into the netlike member 12 with strong force, as compared with the conventional forming member made of cotton string. The fastening or pushing force of the meat 1 or 2 is sufficient if the meat 1 or 2 is simply settled or arranged with the string or netlike member 11 or 12.

In the processing of ham, roast pork and the like, after the meat 1 or 2 is wound or wrapped with the member 11 or 12, the meat 1 or 2 is moved to the heating process such as boiling or smoking. In the heating process, the forming member 11 and 12 is formed of the thermoplastic resin such polyvinylidene choride which has been processed to possess the heat contraction property, the member 11 or 12 contracts at a predetermined rate in the heating process. At this time, meat 1 and 2 are fastened by the contraction member 11 and 12 and the meat 1 and 2 are arranged to a propely fastened state naturally. Accordingly, the processed meat such as ham, roast pork and the like can be fastened by the member 11 or 12 strongly can be manufactured as a product having a good external apperance or form. Further, since the forming member 11 or 12 is formed of the thermoplastic resin, bacteria are hard to attach to the forming member and contamination by bacteria is extremely reduced, the processed meat being wholesome.

Furthermore, the forming member 11 and 12 made of polyvinylidene chloride and the like can be manufactured so that the heat contractibility thereof can be changed to any value. More particularly, by adjusting the composition of resin and type and amount of additive such as plasticizer and/or by adjusting the draw ratio in the extrusion and drawing process, the heat contractibility can be changed to any value. Accordingly, the heat contractibility of the forming member 11 or 12 can be changed corresponding to the kind of meat to be processed so that the degree of fastening the meat 1 or 2 can be adjusted.

As an actual forming member 11 or 12, a member formed by bundling 30 filaments of fibers of 30 deniers made of vinylidene chloride is used. In this case, the heat contractibility thereof can be established widely from small contractibility to high contractibility, for example, in or over the range from about 10% to 70% in response to the heating temperature of 60° C. to 100° C.

As described above, the present invention can provide the processed meat such as ham, roast pork and the like having good external apperance. Further, a wholesome product can be manufactured without contamination of the forming member due to bacteria.

We claim:

1. A method of arranging a form of processed meat comprising:

arranging string made of polyvinylidene chloride on raw meat, said string having a heat contraction property; and heating the meat with the string to cause said string to contract;

whereby a form of the heated meat is arranged by the heat contraction of the string.

2. A method of arranging a form of processedmeat, comprising:

settling a net made of polyvinylidene chloride on raw meat, said net having a heat contraction property; and heating the meat with the net to cause the net to contract;

whereby a form of the heated meat is arranged by the heat contraction of the net.

3. A method of arranging a form of processed meat according to claim 1, wherein said string has a heat contraction property of about 10 to 70 pecent in response to a heating temperature of 60° C. to 100° C. and the meat is heated to a temperature between 60° C. to 100° C.

4. A method of arranging a form of processed meat according to claim 2, wherein said net has a heat contraction property of about 10 to 70 percent in response to a heating temperature of 60° C. to 100° C. and the meat is heated to a temperature between 60° C. to 100° C.

5. A method of arranging a form of processed meat according to claim 3, wherein said string is made by extruding said polyvinylidene chloride, cooling said extruded polyvinylidene chloride and uniaxially drawing said cooled extruded polyvinylidene chloride.

6. A method of arranging a form of processed meat according to claim 4, wherein said net is made by extruding said polyvinylidene chloride, cooling said extruded polyvinylidene chloride and uniaxially drawing said cooled extruded polyvinylidene chloride.

* * * * *

UNITED STATES PATENT AND TRADEMARK OFFICE
CERTIFICATE OF CORRECTION

PATENT NO. : 4,883,677

DATED : November 28, 1989

INVENTOR(S) : Tadao Aiga, et. al.

It is certified that error appears in the above-identified patent and that said Letters Patent is hereby corrected as shown below:

On the title page:

Item [75] Inventors: Change "Tadao Aiga, Tokyo; Masoyoshi Kimura, Chiba, both of Japan" to --Tadao Aiga, Tokyo; Masayoshi Kimura, Chiba, both of Japan--

Signed and Sealed this

Eighteenth Day of December, 1990

Attest:

HARRY F. MANBECK, JR.

*Attesting Officer*  *Commissioner of Patents and Trademarks*